United States Patent [19]

Morgan

[11] Patent Number: 4,522,083
[45] Date of Patent: Jun. 11, 1985

[54] BICYCLE HANDLEBAR GRIPS

[76] Inventor: Clyde R. Morgan, Box 302, Coeur d'Alene, Id. 83814

[21] Appl. No.: 522,189

[22] Filed: Aug. 10, 1983

Related U.S. Application Data

[63] Continuation of Ser. No. 211,073, Nov. 28, 1980, abandoned.

[51] Int. Cl.³ .............................................. B62K 21/26
[52] U.S. Cl. .................................... 74/551.9; D8/303; D8/DIG. 8
[58] Field of Search ............................ 74/551.9, 558.5; D8/303, DIG. 8

[56] References Cited

U.S. PATENT DOCUMENTS

| 144,446 | 4/1846 | Black .................................. D8/303 |
| 366,775 | 7/1887 | Jeffery . |
| 4,380,093 | 4/1983 | Morgan ............................. 16/110 R |

FOREIGN PATENT DOCUMENTS

| 632946 | 1/1928 | France ................................ 74/551.9 |
| 804751 | 11/1936 | France . |
| 933451 | 4/1948 | France ................................ 74/551.9 |
| 1221709 | 6/1960 | France . |
| 142143 | 11/1980 | Japan .................................. 74/551.9 |
| 7611775 | 10/1976 | Netherlands ...................... 74/551.9 |
| 19105 | 10/1908 | United Kingdom . |
| 414722 | 8/1934 | United Kingdom .............. 74/551.9 |

Primary Examiner—Kenneth J. Dorner
Attorney, Agent, or Firm—Wells, St. John & Roberts

[57] ABSTRACT

A handlebar grip is described for the drop portion of a racing bicycle handlebar. The grip includes a flexible elongated body for fitting over the handlebar. An enlarged palm and thumb cheek support member formed integrally with the elongated body having a wall that extends upward and outward over the elongated body. A vibration absorbing means is provided intermediate the wall and the elongated body for minimizing the transmission of vibration from the handlebar to the palm of the hand.

6 Claims, 7 Drawing Figures

U.S. Patent Jun. 11, 1985 Sheet 1 of 2 4,522,083
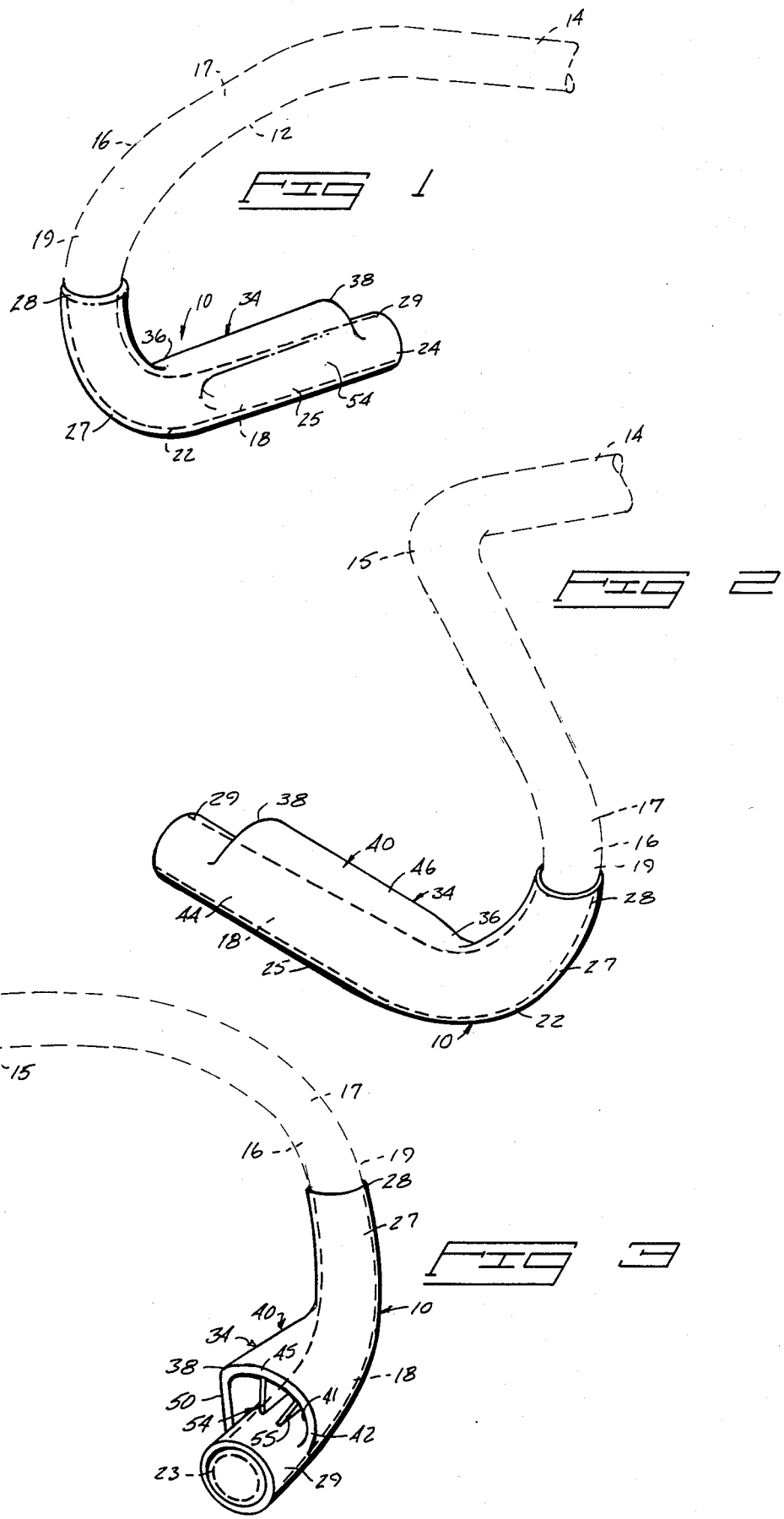

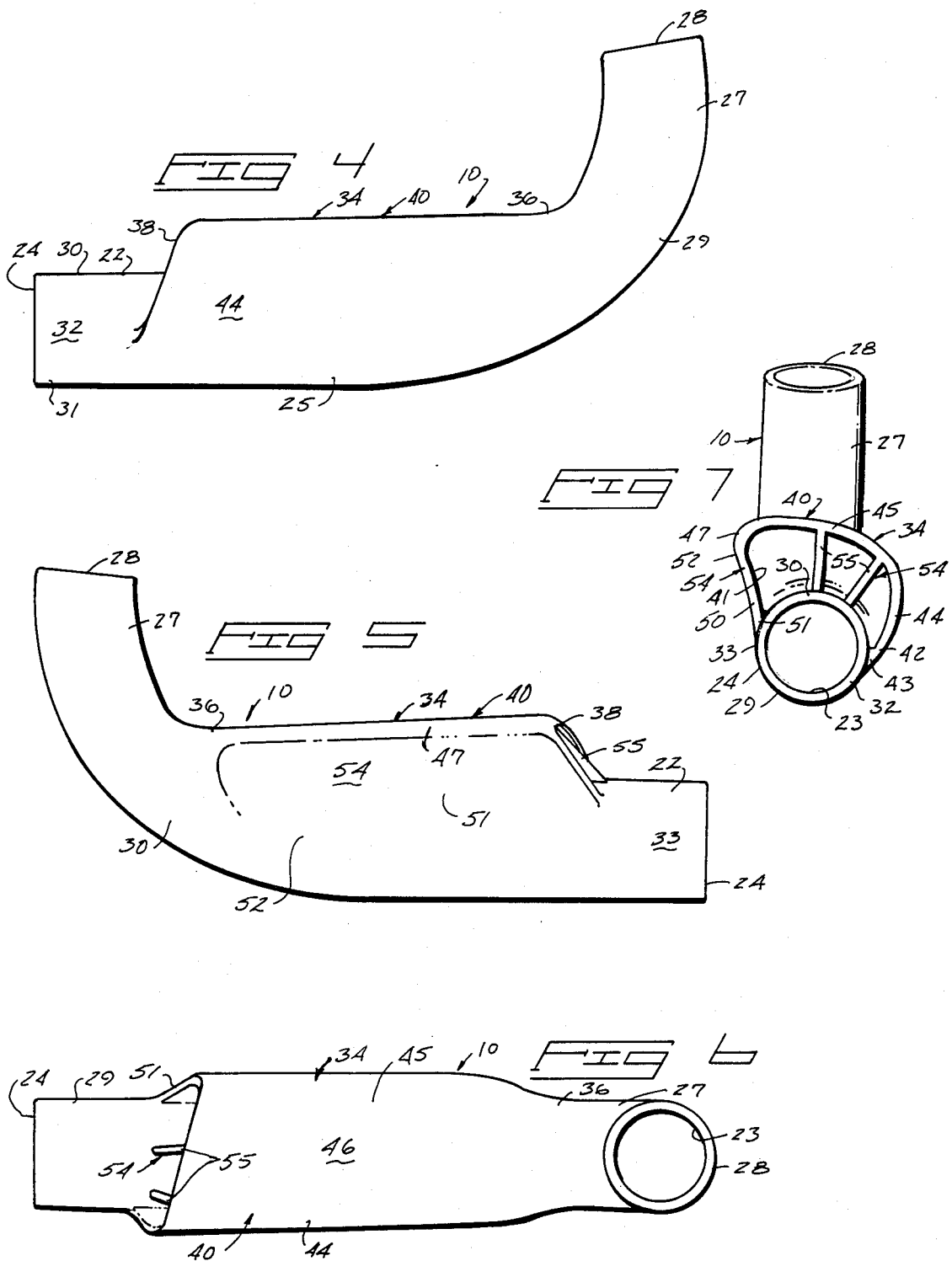

BICYCLE HANDLEBAR GRIPS

This is a continuation of application Ser. No. 211,073, filed Nov. 28, 1980, now abandoned.

TECHNICAL FIELD

This invention relates to handlebar grips for bicycles and more particularly grips for racing bicycle handlebars most frequently utilized on 10-speed bicycles.

A complementary patent application disclosing and claiming a handlebar grip that fits about the inner section of a handlebar was filed simultaneously by applicant on Nov. 28, 1980 and has subsequently issued as U.S. Pat. No. 4,380,093 on Apr. 19, 1983.

BACKGROUND OF THE INVENTION

Bicycle handlebars are generally constructed from rigid tubular metal that is formed with various curves which are rather difficult to grip when the metal is wet. Additionally, the metal bar directly transfers vibration from the bicycle directly to the biker's hand. It is not unusual for a biker, either during a race or on an extensive trip, to become quite fatigued from the vibration that is transmitted directly from the handlebar to the hands. It is not unusual for a biker to develop what is called "biker's nerve palsy" in the palm of the biker's hand from the vibration.

Numerous types of handlebar grips have been designed to make bicycle riding more comfortable and to minimize the slippage of the hand on the handlebar and to increase the ability of the biker to hold onto the handlebar. Various types of finger contour grips have been designed which have indentations and projections to assist in gripping the handle bar. Additionally, surface contouring has been placed on the exterior surface of the handle bar to increase the gripping ability. Examples of such prior art designs are illustrated in U.S. Pat. Nos. De. 144,446; De. 231,044; and De. 248,616.

Additionally, grips have been envisioned to attempt to contour the grip more conveniently to the shape of the hand to provide a more secure grasp and to support the hand more comfortably on the handlebar. An example of such a grip is illustrated in the Jeffery U.S. Pat. No. 366,775.

More recently, padded type grips have been developed, generally of open cellular foam material that is placed on the handlebars to provide some cushioning. One of the problems with such open cellular cushioning material is that the material readily compresses and is not able to absorb vibrations but merely serves as a slight cushioning material and enables the rider to more securely grip the bar. Furthermore, when the rider is pulling on the handlebar, the open cell material compresses causing a "give" until the cushion material "bottoms out". Consequently, such open cellular foam material does not provide the desired tactile responses and additionally does not absorb the vibration.

One of the objects of this invention is to provide a handlebar grip for the drop portion of a racing bicycle handlebar in which the rider is able to securely grip the handlebar without having to apply substantial squeezing pressure.

Another object is to provide a grip that enables the hand to assume a comfortable orientation that is less fatiguing than previous handlebar grips.

A further object of this invention is to provide a handlebar grip for the drop portion of a racing bicycle handlebar that does not readily compress when squeezed, but which has the ability to absorb vibration and shock and to minimize the transfer of the vibration and shock to the palm of the biker's hand.

BRIEF DESCRIPTION OF THE DRAWINGS

A preferred embodiment of this invention is illustrated in the accompanying drawings, in which:

FIG. 1 is a pictorial view of the subject handlebar grip showing the handlebar grip mounted on the drop portion of a racing bicycle handlebar;

FIG. 2 is a pictorial view of the bicycle handlebar grip mounted on the handlebar as seen from the left in FIG. 1;

FIG. 3 is a pictorial view of the handlebar grip as seen from the left in FIG. 2;

FIG. 4 is a side elevational view of the bicycle handlebar grip;

FIG. 5 is a side elevational view of the bicycle handlebar grip from a side opposite the side shown in FIG. 4;

FIG. 6 is a top plan view of the bicycle handlebar grip as seen from above in FIG. 4; and FIG. 7 is an end view of the bicycle handlebar grip as seen from the right in FIG. 5.

DETAILED DESCRIPTION OF A PREFERRED EMBODIMENT

Referring in detail to the drawings, it is illustrated in FIG. 1 a handlebar grip generally designated by the numeral 10 for mounting on a racing bicycle handlebar 12 illustrated in dotted lines in FIGS. 1-3. A racing bicycle handlebar is frequently mounted on 10-speed bicycles and has become a rather standard handlebar for all 10-speed bicycles independently of whether the bicycle is used for racing. A racing bicycle handlebar is usually constructed of a tubular material that is bent at several locations forming a highly contoured shape. The handlebar generally has a cross-over portion 14 (FIG. 2) that extends outward from a center line of a handlebar to a "turn of the bar" portion 15 in which the handlebar is bent and extends forward to a drop portion 16 that extends downward in a substantially U shape terminating in a straight portion 18 that extends rearward with respect to the intended direction of travel of the bicycle. The straight portion 18 is generally oriented rearward with a slight inclination in a downward direction. A brake lever attachment (not shown) is generally mounted to the handlebar at a mounting position 17 intermediate the "turn of the bar" portion 15 and the drop portion 16. The drop portion 16 has a front curve portion or bend 19 that extends forward and downward and then rearward terminating into the straight portion 18.

The handlebar grip 10 is designed to fit onto the drop portion 16. The bicycle rider generally grips the straight portion 18 of the handlebar to obtain the maximum leverage and body advantage to apply maximum torque to the crank.

The handlebar grip 10 includes an elongated flexible tubular body 22 that has an annular bore 23 that is complementary to the tubular drop portion 16 to enable the tubular body 22 to slide onto the drop portion 16. The elongated flexible tubular body 22 extends from a rear end 24, adjacent the termination of the straight portion 18, along a finger gripping segment 25 and a curved neck segment 27. The body terminates in a forward curved end 28. The finger gripping segment 25 extends along the straight portion 18 and the curved neck segment 27 extends upward from the finger gripping segment 25 along a substantial portion of the front curved portion 19. The forward end 28 terminates before reaching the brake lever attachment mounting position 17.

The tubular body 22 preferably has substantially uniform thickness and is constructed of a material that is quite flexible but not highly compressible. Consequently, the curved neck segment 27 may be easily slid past the straight portion 18 to the curved portion 19 because of its flexibility. However, the material is not highly compressible so that the rider can attain a positive tactile feel without "give" between his fingers and the handlebar. The tubular body 22 has a cylindrical outer surface 29 that is substantially coaxial with a center axis of the handlebar between the rear end 24 and the forward end 28. For purposes of explanation, the finger gripping segment 25 will be referred to as having an upper side 30, a lower side 31, an outer side 32 and an inner side 33 as viewed from the rear end as illustrated in FIG. 7. The outer side 32 faces away from the center of the handlebar and the inner side 33 faces the center of the handlebar.

The handlebar grip 10 further includes an elongated enlarged palm and thumb-cheek support member 34 that is formed integrally with the tubular body 22 in which the support member 34 extends longitudinally along and above the finger gripping segment 25. The support member 34 extends from a forward end 36 adjacent the intersection of the finger gripping segment 25 and the curved neck segment 27 as the member 34 extends rearward to an enlarged rearward end 38 adjacent the rear end 24.

The support member 34 has a partially encircling wall 40 that partially encircles the segment 25 and defines a cavity 41 therebetween. The cavity 41 (FIG. 7) is closed at the forward end 36 and progressively increases in cross section to a constant cross section that leads to the enlarged rear end 38. The cavity 41 has an irregular cross section that is defined by the interior contours of the wall 40.

The wall 40 includes a wall section 42 that extends outward and upward from the outer side 32. The wall section 42 interfaces with the outer side 32 at a flared base 43. The wall section 42 extends outward substantially tangential to the outer surface 29 of the finger grip segment 25 at the outer side 32. The wall section 42 extends radially outward and is curved upwardly when viewed in cross section in the longitudinal direction of the finger grip segment 25. The wall section 42 forms a curved convex outer surface 44 that has a spiral curvature that is adapted to support the palm of the hand adjacent to the fingers spaced from the handlebar.

The wall 40 further includes an overlying wall section 45 that is formed integrally with the wall section 42 that overlies the upper side 30 of the finger grip segment 25. The overlying wall section 45 has a substantially uniform thickness and is relatively flexible forming a gradually curved convex surface 46 that extends over the upper side 30 terminating at a thumb ridge 47 that is on the opposite side of the center axis from the wall section 42. The wall 40 further includes a wall section 50 that extends upward from a base 51 and inner side 33. The base 51 extends substantially tangentially upward from the outer surface 29 at the inner side 33. The wall section 50 has a somewhat flat upright surface 52 (FIGS. 5,7) formed thereon that extends upward to the thumb ridge 47. The surface 52 forms a fingertip rest 54 for receiving the tips of at least the middle and ring fingers and possibly the little finger, depending upon the length of the little finger.

The wall 40 is formed as one integral component with the wall sections 42 and 50 extending outward and upward substantially tangential to the outer surface 29 of the finger grip segment 25. When viewed from the rear end with the curved neck segment 27 extending vertically as in FIG. 7, the wall section 42 is seen to extend outwardly tangentially to the outer surface 29 of the finger gripping segment 25 at approximately the 145° clockwise position. The wall section 50 extends radially outward and upward from the outer surface 29 at approximately the 270°–320° clockwise position.

The handlebar grip 30 further comprises a vibration absorbing means generally designated with the numeral 54 (FIGS. 6 and 7) that is located within the cavity 41 for absorbing the vibration of the handlebar and preventing the vibration from being transmitted to the palm and thumb cheek portion of the hand. Such a feature greatly reduces the cyclist's fatigue due to the vibration and greatly reduces the chances that the cyclist will develop "biker's nerve palsy". It should be noted that the nerves to the fingers pass through the palm area and it is not unusual with traditional grips for the nerves to undergo trauma from the vibration during long or prolonged bike rides. Consequently, one of the major objectives of this invention is to reduce the chance that the cyclist will develop "biker's nerve palsy". The vibration absorbing means 54 is of such a nature that the rider is not able to substantially compress or deflect the wall 40 by merely increasing gripping pressure. Consequently, the palm and hand cheek is always supported away from the handlebar. However, the vibration absorbing means 54 does reduce the transmission of vibration from the handlebar to the palm and thumb cheek.

With prior art open cell foam grips, the bike rider can readily compress the foam by increasing his grip until the foam "bottoms out". When the foam "bottoms out", then the bike rider has a good tactile feel and interface with the handlebar. However, when the foam "bottoms out", very little, if any, absorption occurs and there is substantial transmission of the vibration through the compressed foam to the palm and the thumb cheek. In contrast, the vibrational absorbing means 54 is designed to maintain the structural integrity of the handlebar grip so that excellent tactile interface is maintained between the finger pads and the handlebar while still at the same time supporting and minimizing vibration transmission to the palm and thumb cheek. Preferably, the vibration absorbing means 54 includes radial ribs 55 that are formed of flexible material that extends longitudinally from the narrow forward end 36 to the enlarged rearward end 38. The radial ribs 55 are sufficiently flexible to enable the ribs or webbing 55 to bend or compress slightly to resist the transmission of vibration. Preferably, the longitudinal ribs 55 are formed integrally with the wall sections 42 and 50. Additionally, the wall sections 42 and 50 serve as web or rib members 55 to support the overlying wall section 45. The overall shape of the wall 40 and segment 25 is intended to produce the most comfortable grip when being grasped in the "correct" manner. Improper gripping is therefore discouraged.

Preferably, the handlebar grip is made as a unitary element from injection molding utilizing vinyl, urethane or synthetic rubber material having a modulus of elasticity of between 500 psi and 5000 psi to provide substantial flexibility without providing the compressibility that is associated with open cellular foam material.

The handlebar grip 10 is designed so that the fingers between the palm and second joint extend along and engage the lower side 31 of the finger grip segment 25 and are in tactile contact with the handlebar section 18. The third joint and finger tips (particularly the middle finger, the ring finger and the little finger) wrap around the side 24 and bear against the surface 52. The tips of the fingers (middle finger, ring finger and little finger) extend into the fingertip rest 54. The index finger extends about the lower side 31 adjacent the intersection of the curved neck segment 27 and the finger grip segment 25. The thumb extends forward with the cheek portion riding on the overlying wall section 45 and extending forward with the tip of the thumb engaging the side of the curved neck segment 27 with the tip of the thumb and the index finger substantially circumscribing the tubular body 22 adjacent the intersection of the curved neck segment 27 and the finger grip segment 25. The section 45 at the intersection with the neck section 27 encourages a forward "correct" grip adjacent the hand brake grips (not shown) so there is always quick and easy access to the brake levers. The remainder of the palm from the thumb cheek to the fingers extends along the overlying wall section 45 and downward along the wall section 42. The contour of the wall 40 is compatible with the contour of the palm and thumb cheek as the fingers are wrapped around the lower side 31 of the outer surface 29 of the finger grip segment 25. In this manner the finger pads between the base of the fingers and the outer joint are in firm, substantially noncompressible interface with the straight portion 18 so that the rider does not have to compress the grip before obtaining a strong tactile feel. However, the palms and thumb cheek 34 are supported substantially away from the upper side 31 of finger grip segment 25 with the vibration absorbing means 34 therebetween to prevent transmission of vibration to the palm and thumb cheek region of the hand. Consequently, the rider is able to obtain a firm grip and substantially rigid interface contact with the handle bar along the finger pads from the base of the fingers to the outer joints while still at the same time supporting and minimizing the transmission of vibration to the palm and cheek region.

Additionally, when the cyclist desires to coast and rest, he can bear most of his trunk weight on the wall 40 without the wall 40 collapsing to a "bottom out" condition in which the wall 40 bears against the upper side 30. The "bottom out" condition is prevented by the vibration absorbing means 54.

It should be noted that the above described embodiment is simply illustrative of the principal of this invention and that numerous other embodiments may be readily devised without deviating therefrom. Therefore, only the following claims are intended to define this invention.

What I claim is:

1. A handlebar grip for a bicycle with a racing bicycle handlebar having a drop portion which is substantially tubular about a central axis and includes (1) a substantially straight end section that extends from a terminal rear end forward in the intended direction of travel of the bicycle and (2) a front curved section that is formed integrally with the straight section and extends upwardly therefrom in a curved shape, comprising:

an elongated cylindrical tubular body made of flexible material and having an internal cylindrical bore adapted to coaxially receive the straight end section of the drop portion of a handlebar and also to extend upward along a portion of its front curved section;

said tubular body having an upwardly curved neck segment terminating at a forward end and adapted to extend along the front curved section of the drop portion of a handlebar and an integral finger gripping segment terminating at a rear end and adapted to extend along the straight end section of the drop portion of a handlebar; said finger gripping segment having an upper side and a lower side extending between opposed inner and outer sides;

an integral enlarged palm and thumb cheek support member extending longitudinally along and above the finger gripping segment of the said tubular body;

said enlarged palm and thumb cheek support member extending radially outwardly from both the inner and outer sides of the finger gripping segment of the tubular body to partially encircle the finger gripping segment of the tubular body and being spaced apart therefrom in an overlapping position across the upper side thereof;

said enlarged palm and thumb cheek support member extending longitudinally along the tubular body from a forward end at the intersection of the finger gripping segment and the curved neck segment to a rearward end adjacent the rear end of the finger gripping segment;

said enlarged palm and thumb cheek support member having (1) a convex outer surface that extends radially outward and upward from the outer side of the finger gripping segment to support the palm of a cyclist's hand adjacent to the cyclist's fingers; (2) an overlying surface extending from the convex surface over the finger gripping segment to a thumb ridge above the inner side of the finger gripping segment for supporting the cyclist's thumb cheek and the hand palm adjacent the thumb cheek; and (3) a finger tip surface extending inward and downward from the thumb ridge to the finger gripping segment in which the finger tip surface is adapted to receive the finger tips; and vibration absorbing means comprising resilient material interposed between said enlarged palm and thumb cheek support member and the tubular body for absorbing vibrations of the bicycle handlebar to minimize the transmission of such vibration from the handlebars to the cyclist's hands to minimize biker's fatigue and biker's nerve palsy.

2. The handlebar grip as defined in claim 1 wherein the thumb ridge extends forward toward the curved neck segment to enable the cyclist's thumb to extend forward to the curved neck segment with the tip of the thumb engaging and extending alongside the curved neck to encircle the curved neck segment in conjunction with the cyclist's index finger.

3. The handlebar grip as defined in claim 1 wherein the finger tip surface is concavely shaped to receive the finger tips of at least the middle and ring fingers.

4. The handlebar grip as defined in claim 1 wherein the enlarged palm and thumb cheek member includes a flexible wall formed integrally with the finger gripping segment that extends upward from both sides of the finger gripping segment and overlying the finger gripping segment generating a cavity between the overlying wall and finger gripping segment and wherein the vibration absorbing means is located within the cavity to flexibly support the overlying wall spaced from the finger gripping segment and permit the wall to flex in response to the vibration to dampen the vibration.

5. The handlebar grip as defined in claim 1 wherein the vibration absorbing means includes flexible ribs within the cavity extending between the flexible overlying wall and the finger gripping segment for supporting the flexible overlying wall spaced from the finger gripping segment and for bending to absorb vibration.

6. The handlebar grip as defined in claim 1 wherein the flexible ribs extend in a longitudinal direction with respect to the central axia long the finger gripping segment.

* * * * *